US006078043A

United States Patent [19]

Palmer et al.

[11] Patent Number: 6,078,043

[45] Date of Patent: Jun. 20, 2000

[54] MASS SELECTOR

[75] Inventors: Richard E Palmer, Stourbridge, United Kingdom; Bernd Von Issendorff, Freiburg, Germany

[73] Assignee: University of Birmingham, United Kingdom

[21] Appl. No.: 09/125,824

[22] PCT Filed: Feb. 27, 1997

[86] PCT No.: PCT/GB97/00557

§ 371 Date: Mar. 8, 1999

§ 102(e) Date: Mar. 8, 1999

[87] PCT Pub. No.: WO97/32336

PCT Pub. Date: Sep. 4, 1997

[30] Foreign Application Priority Data

Feb. 27, 1996 [GB] United Kingdom .................. 9604057

[51] Int. Cl.[7] .............................. B01D 59/44; H01J 49/00

[52] U.S. Cl. ........................... 250/287; 250/282; 250/288

[58] Field of Search .................................... 250/287, 288, 250/282

[56] References Cited

U.S. PATENT DOCUMENTS 5,077,472 12/1991 Davis ..................................... 250/292
5,117,107 5/1992 Guilhaus et al. ....................... 250/287
5,144,127 9/1992 Williams et al. ....................... 250/287
5,426,301 6/1995 Turner .................................... 250/288
5,481,107 1/1996 Takada et al. ......................... 250/288
5,663,560 9/1997 Sakairi et al. ......................... 250/288
5,821,534 10/1998 Park ...................................... 250/287

*Primary Examiner*—Bruce C. Anderson
*Attorney, Agent, or Firm*—Andrus, Sceales, Starke & Sawall

[57] ABSTRACT

A mass selector is disclosed for separating particles in a particle beam according to mass. The selector has a pair of first eletrodes (12, 14) defining an elongate first path (16) for the passage of a focused particle beam. A pair of second electrodes (24, 26) are spaced from the pair of first electrodes (12, 14) and define an elongate second path (28) for separated particles. The first and second paths (16, 28) are mutually parallel. A first voltage pulse is applied across the first electrodes (12, 14) so that the particles in a portion of the beam which is in the first path (16) are accelerated transversely of their direction of movement along said first path toward said second path. A second voltage pulse is applied across the second electrodes (24, 26) so that particles which have been accelerated by said first voltage pulse and which have entered said second path (28) are decelerated transversely of their direction of movement along said second path.

15 Claims, 4 Drawing Sheets

Figure 3:
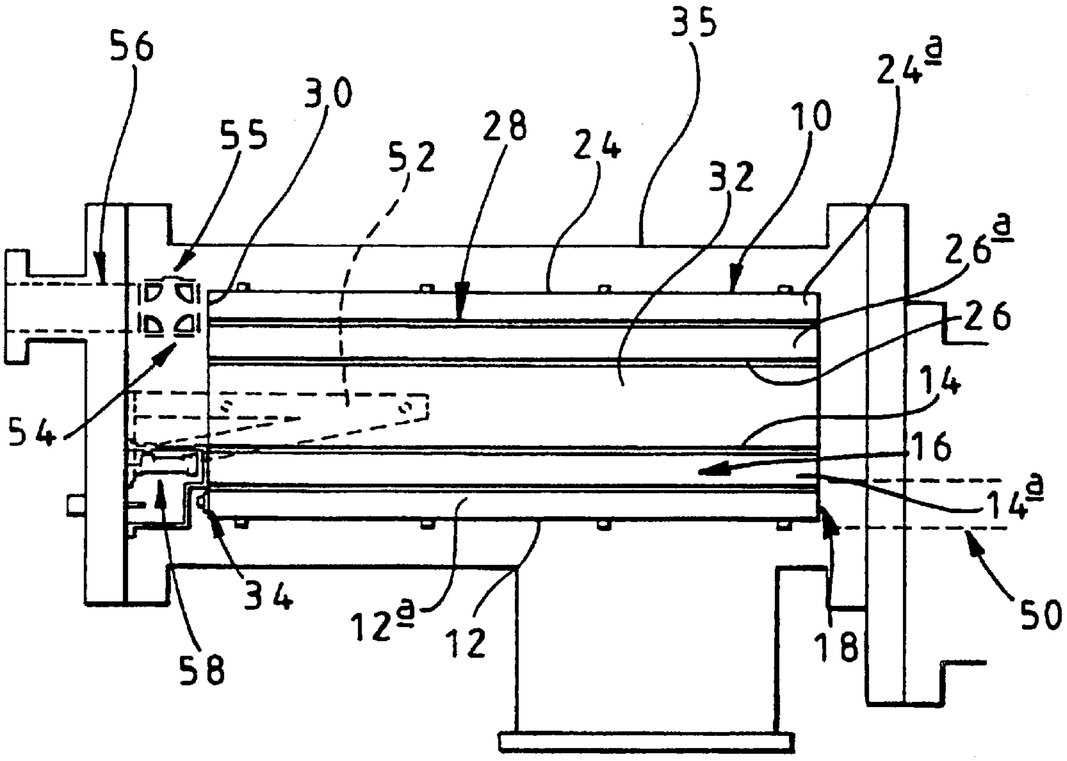

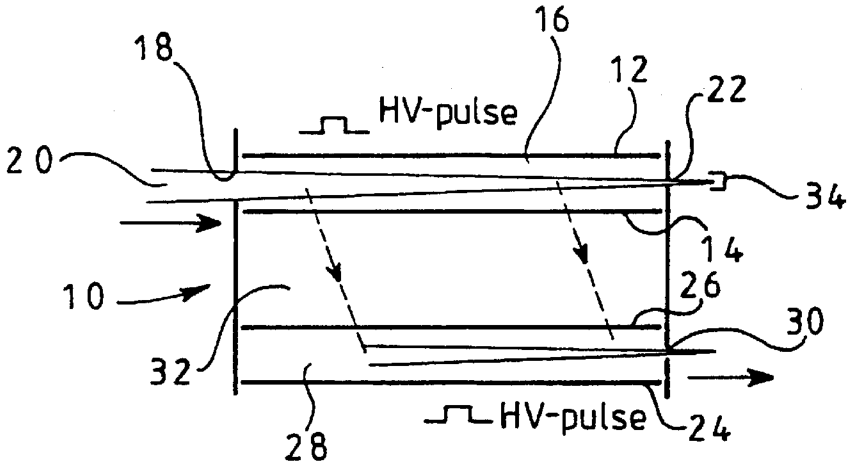
FIG 1
FIG 2
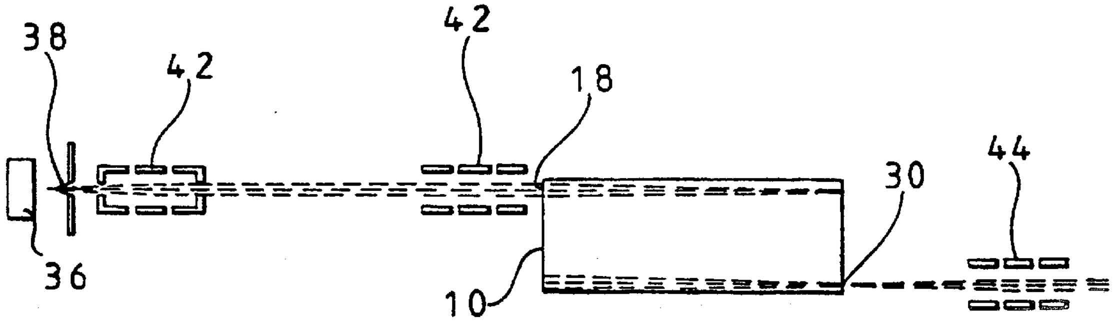

MASS SELECTOR

This invention relates to mass selectors for separating particles according to their mass. The term "mass selector" as used herein is intended to include not only apparatus in which separation (or filtration) of particles having a particular mass or range of masses is effected for the purpose of studying and/or using such particles, but also separation of particles according to their mass for determining the chemical composition of a sample by mass spectrometry. However, the present invention is mainly concerned with a mass selector operated as a filter to enable particles of a selected mass or range of masses to be separated for further study and/or use.

The present invention is particularly suitable in the growing field of cluster physics which involves studying particles of nanometre dimensions. Improvement of existing mass selection techniques in this field is urgently needed.

In existing time-of-flight mass spectrometers currently used for the investigation of free clusters, a beam of ionized particles to be studied is accelerated by a high voltage pulse across a pulse region and subsequent static acceleration fields and, in most cases, is detected at the end of a field-free region. Sometimes, an exit gate is used instead of the detector to filter out one particle size. In such cases, the acceleration of the particles is such that particles of the same mass reach the exit gate at the same time. By opening the exit gate momentarily, particles of the same size can pass through the gate whilst particles of other sizes reach the gate when closed and so do not pass through. The mass of the particles selected for passage through the gate is chosen by opening the gate an appropriate time after the voltage pulse has been applied across the plates.

However, a disadvantage of this standard type of mass selector is that it has a very low total transmission ($<10^{-1}$). Thus, it is not suitable for use if a large number of mass-selected particles are required (eg for surface or matrix deposition of mass-selected clusters). The standard techniques for the production of continuous mass-selected ion beams involving magnetic sector field or quadrupole mass selectors, which combine higher resolution with a high transmission, only have limited mass ranges and can typically only be used for particles with masses less than about 5000 amu (atomic mass units).

It is an object of the present invention to provide an improved mass selector which can enable the problem of low total transmission to be obviated or mitigated whilst at the same time being suitable for use with particles having a wider range of masses than has been possible with conventional magnetic sector field or quadrupole mass selectors.

According to one aspect of the present invention, there is provided a mass selector for separating particles in a particle beam according to mass, said selector including a pair of first electrodes between which is defined an elongate first path for the passage of the particle beam, means for focusing the particle beam so that, in use, a focused particle beam passes along the elongate first path, a pair of second electrodes spaced from the pair of first electrodes in a direction transversely of the direction of extent of the first path, said pair of second electrodes defining therebetween an elongate second path for separated particles, said second path being parallel to said first path, first voltage-applying means for applying a first voltage pulse across said first electrodes so that, in use, the particles in a portion of the beam which is in said elongate first path are accelerated transversely of their direction of movement along said first path towards said second path, second voltage-applying means for applying a second voltage pulse across said second electrodes so that, in use, particles which have been accelerated by said first voltage pulse and which have entered said second path are decelerated transversely of their direction of movement along said second path, and means for controlling the first and second voltage-applying means so that said first voltage pulse accelerates the particles in said portion of the beam with substantially constant momentum acceleration and the second voltage-applying means applies said second voltage pulse with substantially constant momentum deceleration a pre-selected time interval after said first voltage pulse so that particles of the selected mass pass along said second path in substantially the same mutual dispositions as they travelled along said first path.

According to another aspect of the present invention, there is provided a method of separating particles in a particle beam according to mass, said method comprising the steps of causing a focused particle beam to pass along an elongate first path, applying a first voltage pulse across said first path so as to cause particles of the particle beam disposed in said elongate first path to be accelerated transversely with substantially constant momentum acceleration towards an elongate second path which is substantially parallel to said elongate first path, and applying a second voltage pulse across said second path a pre-selected time interval after application of said first voltage pulse across the first path, said second voltage pulse being so as to decelerate the particles which have been accelerated by said first voltage pulse with substantially constant momentum deceleration so as to cause particles of selected mass to pass along said second path in substantially the same mutual dispositions as in the focused particle beam in the first path.

It will be appreciated that, in accordance with the present invention, it is possible to select particles from a length of the particle beam which is much greater than that which has been possible previously with the above-described conventional time-of-flight mass selector. The result of this is that much higher total transmissions of selected particles is possible. It is found that the total transmission for certain masses can be as high as 70%.

One way of producing substantially constant momentum acceleration and deceleration is to provide a homogeneous accelerating and decelerating field by means of very wide electrodes. It may however be more advantageous to use relatively narrow electrodes fitted with side plates to shield the open sides laterally of the beam. In this latter arrangement, the acceleration/deceleration field is not homogeneous, but it can be arranged by appropriate selection of the dimensions of the side plates to have the same overall effect as a homogeneous field.

It will be appreciated that the above-described arrangement requires the particles to pass through some of the electrodes when travelling from the first path to the second path. This is permitted by making such electrodes permeable to the particles over the length of the particle beam which is being re-directed, in use, from the first path to the second path. The length of the permeable portion of the or each electrode associated with the first path may therefore be chosen so as to determine the length of the particle beam which is passed towards the second path.

In order to ensure that the particles in the portion of the particle beam are accelerated transversely with substantially constant momentum acceleration, said first voltage pulse is terminated before the first particle of said particle beam portion has left the first path transversely. Likewise, said second voltage pulse is applied when all of the selected particles have entered the second path.

To enable semi-continuous operation and efficient selection of particles of the required mass, the controlling means can be arranged to cause said at least one first voltage pulse and said at least one second voltage pulse to be repeated as many times as desired, with repetitions occurring as soon as possible after the emptied acceleration region in the elongate first path has been re-filled by the particle beam.

In the case where pulsing is repeated, it is to be appreciated that the interval between repeat pulses may be so short that there is a risk that the heavier, slower-moving particles from a previous first voltage pulse arrive at the second path at the same time as the selected particles from the subsequent first voltage pulse. Under such circumstances, such heavier, slower-moving particles would be selected along with the desired particles. In order to mitigate this problem, it is within the scope of the present invention to apply a pulse at a time such as to empty the space between the first and second path of such slower-moving particles. This can be achieved by applying a deceleration pulse to the second electrode and simultaneously to one of a pair of side plates disposed on either side of such space.

The means for focusing the particle beam may comprise an electrostatic lens (e.g. an "einzel" lens).

The mass selector according to the present invention is most preferably designed so that the decelerated selected particles moving along the second path are focused at a location corresponding to the location at which the particles in the first path are focused by the focusing means. This allows the use of a small exit aperture and thus enhances the mass resolution.

Figure 4:
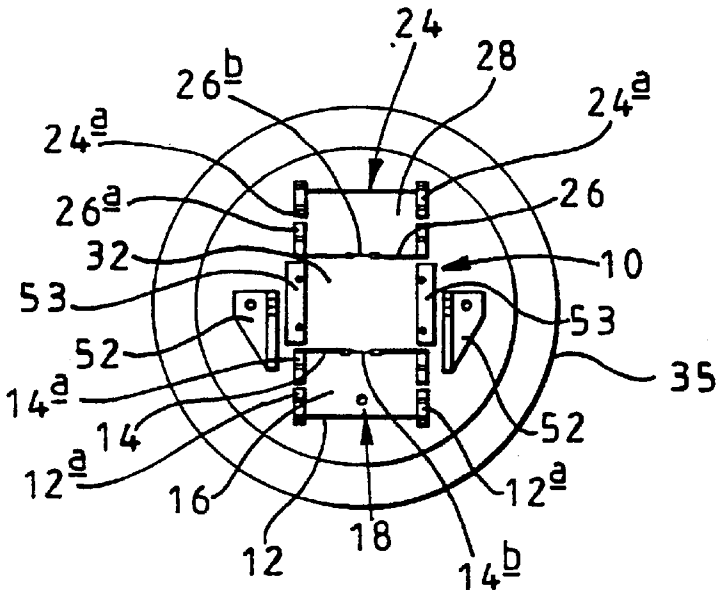
Figure 5:
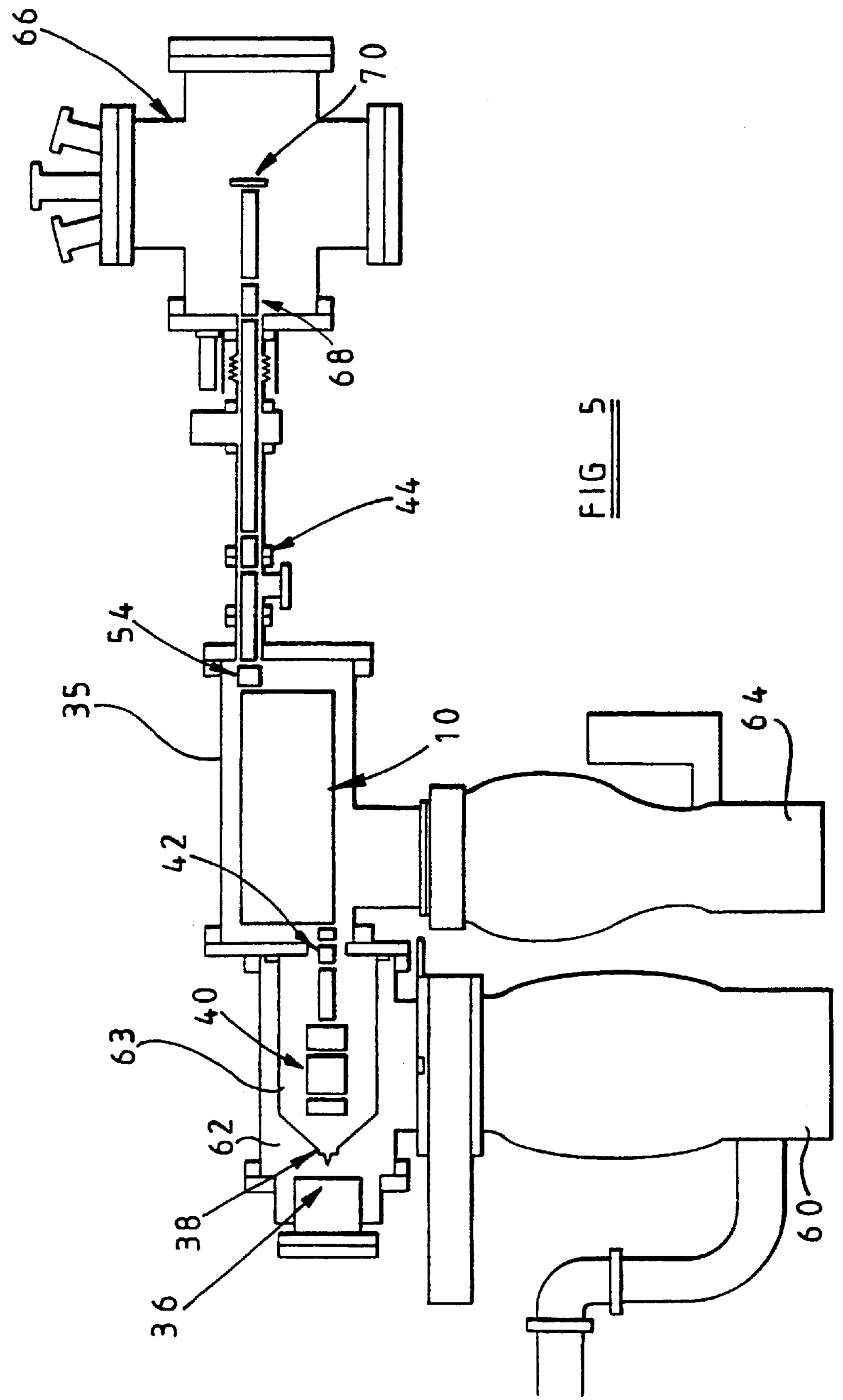
Figure 6:
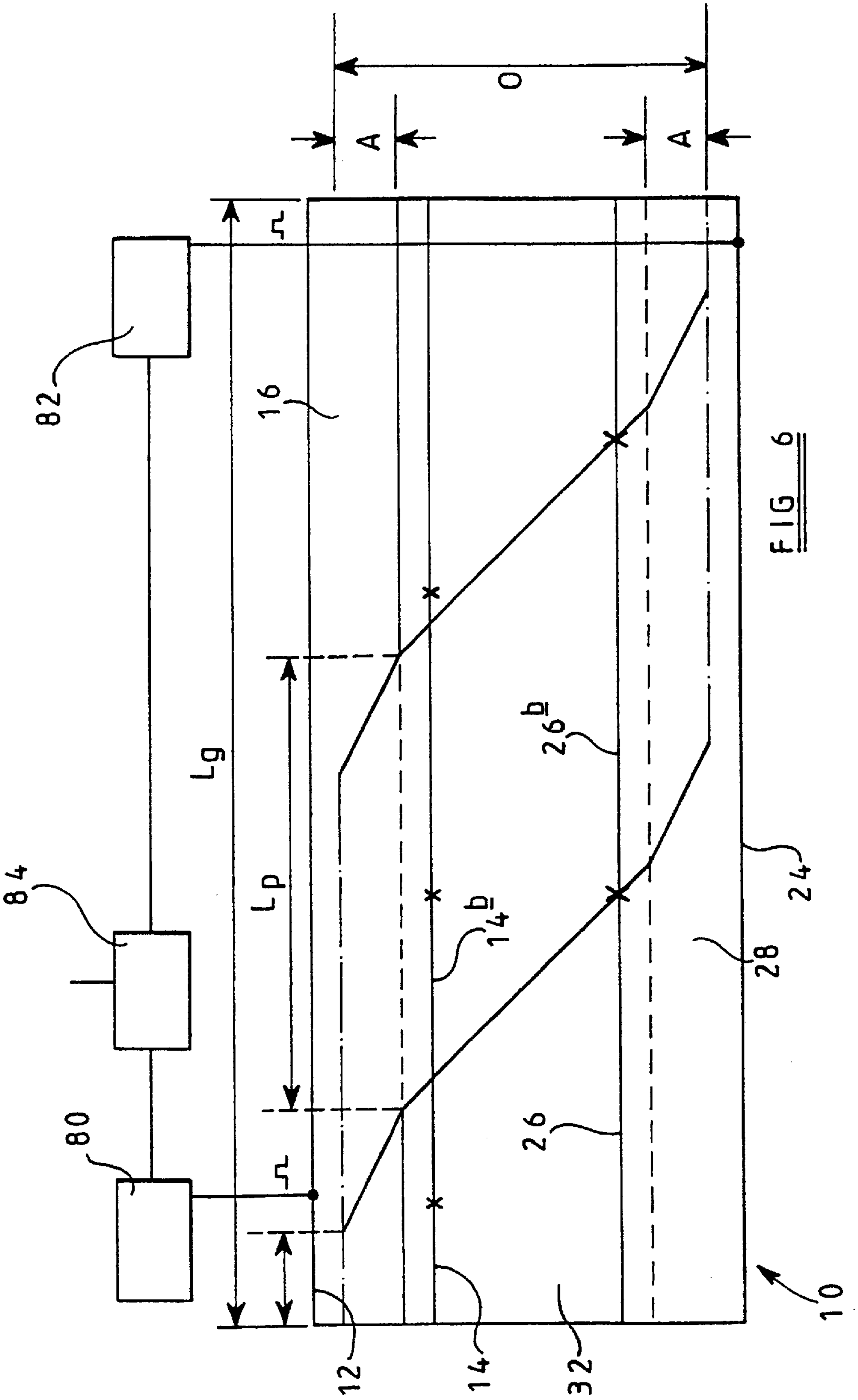

The present invention will now be described in further detail with reference to the accompanying drawings, in which:

FIG. 1 is a schematic illustration showing the principle of operation of a mass selector according to the present invention, FIG. 2 is a schematic illustration showing how the particle beam is generated and focused and how the selected beam of particles is collimated, FIG. 3 is a schematic side view showing a mass selector according to one example of the present invention in greater detail, FIG. 4 is a cross section through the mass selector of FIG. 3, FIG. 5 is a schematic illustration of a mass selector according to the present invention disposed between a particle generating unit and an analysing unit which, in this embodiment, is in the form of a scanning tunneling microscope, and FIG. 6 is a schematic illustration showing movement of particles in the mass selector and also showing pulse generators and a controller therefor.

Referring now to FIG. 1, the mass selector 10 is mounted in a vacuum chamber (not shown in FIG. 1) and comprises a pair of first electrodes 12 and 14 which are mutually parallel and which define between them a first path 16 extending between an inlet aperture 18 for an ionised particle beam 20 and a test outlet aperture 22 which is aligned with the inlet aperture 18 at the opposite end of the mass selector 10.

The mass selector 10 further includes a pair of second electrodes 24 and 26 which are mutually parallel and which define between then a second path 28 leading to an outlet aperture 30 disposed at the same end of the mass selector 10 as the test outlet aperture 22 and in a corresponding position. The first and second paths 16 and 28 are mutually parallel and are spaced apart by a field-free central region 32 of the mass selector 10 The electrodes 14 and 26 are formed partly of metal mesh so as to be permeable to particles of the beam 20.

In use, particle beam 20 is focused through inlet aperture 18 and outlet aperture 22 into a Faraday cup 34 externally of the mass selector 10 by an electrostatic lens system which will be described hereinafter.

A first high voltage pulse is applied across the first electrodes 12 and 14 so that the portion of the particle beam in the first path 16 between the electrodes is accelerated in a direction perpendicular to its direction of travel along the first path 16. The first voltage pulse is applied for a sufficiently short period of time that it ceases before the first particle of the beam has traversed the first electrode 14. The particles in said portion of the beam 20 are thereby subjected to a substantially constant momentum acceleration in a direction perpendicular to their direction of travel along the first path 16. The packet of thus-accelerated particles travels in the oblique direction indicated by the dotted lines in FIG. 1 towards the second path 28 since the particles also have a component of movement in the direction of extent of the first path 16.

It will be understood that, as the particles traverse the field-free region 32, separation of the particles according to mass takes place, with the particles of lower mass travelling faster than the particles of greater mass. After all of the particles of the selected size have entered the second path 28, a second high voltage pulse is applied across the second electrodes 24 and 26 so as to decelerate the particles. The second high voltage pulse supplied is the same as, but in the opposite direction to, the first voltage pulse applied across the first electrodes 12 and 14. The particles within the second path 28 are thereby decelerated so that their component of movement perpendicular to the direction of extent of the second path 28 is stopped. Thus, the separated particles which are in the second path 28 are in the same mutual dispositions as they were in the first path and are focused through the outlet aperture 30.

It will be appreciated that the particles passing through the outlet aperture 30 are mass-selected particles and that the timing of the second voltage pulse relative to the first voltage pulse can be chosen as desired to select particles of the desired mass for exit through the outlet aperture 30. The Faraday cup 34 is provided so as to check that the particle beam 20 passing along the first path 16 is correctly focused.

Conveniently, the height and duration of the voltage pulse applied across the first electrodes 12 and 14 is such that the ionised particles acquire an energy in the perpendicular direction equal to their original energy in the forward direction.

Referring now to FIG. 2 of the drawings, similar parts to those illustrated in FIG. 1 are accorded the same reference numerals. In FIG. 2, the particle beam 20 is generated by evaporating metal (eg silver) from a source in a chamber 36 into a stream of cold helium gas where the metal starts to form particle clusters. A combination of nozzle and skimmer (illustrated schematically at 38) serves to remove most of the helium gas from the cluster beam which is ionised using a magnetically confined gas discharge (not shown). Downstream of the skimmer, the positively charged clusters are accelerated to form a narrow, coherent ion beam by an extraction lens 40. Such narrow beam is focused by an electrostatic lens system 42 or "einzel lens" which provides the focused particle beam 20 entering the mass selector 10 via the inlet aperture 18. The beam of selected particles leaves the mass selector 10 through outlet aperture 30 to pass through a further electrostatic lens 44 to form a parallel ion beam which is passed to any suitable form of analyzing equipment, of which an example will be described later.

Referring now to FIGS. 3 and 4, the mass selector illustrated therein operates on the principle described hereinabove, but with the various parts differently orientated. Parts of the mass selector of FIGS. 3 and 4 which are similar to those described hereinabove in relation to FIG. 1 are accorded the same reference numerals. The mass selector 10 is disposed in vacuum chamber 35. The particle beam 20 enters the mass selector 10 through the inlet aperture 18 via a guard tube 50 which protects the beam 20 against de-focusing. The assembly of electrodes 12, 14, 24 and 26 is supported within the vacuum chamber 35 on support brackets 52 which also serve to secure side plates 53 preventing stray-fields from entering the field-free central region 32. The electrodes 12, 14, 24 and 26 are relatively narrow and are fitted with respective side plates 12*a*, 14*a*, 24*a* and 26*a*.

The first electrode 14 has a central permeable region 14*b* (FIG. 4) defined by a metal mesh which is of a size to allow the passage of particles from the beam therethrough. Likewise, the second electrode 26 is provided with a central permeable region 26*b* formed by a metal mesh to allow entry of particles into the second path 28.

A quadrupole deflector 54 is provided on the opposite side of the outlet aperture 30 to the second path 28. The quadrupole deflector 54 can be operated to direct the beam of selected particles which has passed through the exit aperture 30 either (a) into a Faraday cup 55 to measure absolute selected ion beam current or (b) through a guard tube 56 for further examination in a scanning tunneling microscope (FIG. 5), or (c) to a microsphere plate 58.

Referring now to FIG. 5, parts of the assembly illustrated therein which are similar to previously described parts are accorded the same reference numerals. Inside chamber 36, silver is evaporated out of a crucible (not shown) into a helium flow. Helium gas containing silver clusters then streams through a nozzle from chamber 36 into a chamber 62. A vacuum pump 60 maintains a pressure of less than $1\times10^{-4}$ mbar in the chamber 62. A magnetically confined gas discharge in the chamber 62 ionizes the clusters. Some of the clusters, and also some of the helium gas, enter chamber 63 via the nozzle and skimmer 38. The chamber 63 is pumped by vacuum pump 64 to a pressure of about $8\times10^{-6}$ mbar. The pumps 60 and 64 and the nozzle and skimmer 38 serve to reduce the helium pressure to a value where the production of an ion beam is possible. Such ion beam is passed via the extraction lens 40 and the einzel lens 42 into the mass selector 10 which is disposed in the vacuum chamber 35 to which vacuum pump 64 is connected. Selection of particles within the means selector 10 takes place as described previously. The parallel beam of selected particles from the einzel lens 44 passes into a chamber 66 in which a scanning tunneling microscope (not shown) is disposed. A further einzel lens 68 is provided in the chamber 66 for focusing the beam onto a substrate 70 so that the particles which adhere to the substrate 70 can be examined using the scanning tunneling microscope which is in the chamber 66.

Referring now to FIG. 6, the manner in which the beam of particles moves from the first path to the second path is illustrated in greater detail. The first electrode 12 is connected to a first voltage pulse generator 80, whilst the second electrode 24 is connected to a second voltage pulse generator 82. The first electrode 14 and the second electrode 26 (i.e. the permeable inner electrodes adjacent the field-free region 32) are maintained at all times at the beam potential, whilst the electrodes 12 and 24 are at the beam potential between pulses. The pulses generators 80 and 82 are controlled by a controller 84 which can be used to set not only the magnitude and duration of the first and second pulses generated by the first and second pulse generators 80 and 82, but also the timing of the pulse generators 80 and 82. Thus, as will be apparent from the foregoing description, the controller 84 can be used to choose the mass of the selected particles which pass through the outlet aperture 30 for examination, etc. In this embodiment, the permeable region 14*b* of the first electrode 14 is chosen to be of a size such that it permits the desired length of the beam to pass across the field-free region 32 into the second path 28.

A particular and non-limiting example of use of the above-described mass selector will now being described.

In this example, the ion source 36 is silver in a crucible which is heated to evaporate silver into a stream of cold helium gas at a pressure of 5 mbar where the silver starts to form clusters. The nozzle and skimmer apertures are 0.8 mm and 2 mm, respectively. A beam of silver ions ($Ag_1^+$, $Ag_2^+$, $Ag_3^+$, etc) having an energy of 200 eV is produced. The extraction lens 40 is of the 3-electrode type charged at −300 V, −90 V and −200 V, respectively. The einzel lens 42 is also of the electrode type, being charged at −200 V, −400 V and −200 V, respectively. The einzel lenses 44 and 68 are similarly both of the 3-electrode type, being charged at −200 V, −550 V and −200 V, respectively. The potential of the substrate 70 can be varied in order to accelerate or decelerate the clusters prior to deposition. The typical impact energy is 50 eV.

The einzel lens 42 focuses the ion beam through the inlet aperture 18 and through the test exit aperture 22 which have respective diameters of 6 mm and 2mm. Correct focusing is checked using the Faraday cup 34.

The total length Lg (FIG. 6) of the chamber is 370 mm whilst the length Lp of the permeable part 14*a* of the electrode 14 is 150 mm. The field length between the inlet aperture 18 and the first part of the beam which passes through the permeable region 14*a* of the electrode 14 is 30 mm. The acceleration/deceleration length A is 20 mm. The offset O between the beam axis in the first path 16 and that in the second path 28 is 120 mm.

The first and second voltage pulses across the electrodes 12 and 14 and 24 and 26, respectively, are each 400 volts for 2.12 $\mu$s. The second pulse is started when the centre of the mass of the ion packet which has traversed the field-free central region 32 has reached a location which is 20 mm before the intended beam axis. The ions cover a distance of 20 mm perpendicular to the beam axis during the first voltage pulse and the distance between the first electrodes 12 and 14 is 40 mm. The distance between the second electrodes 24 and 26 is the same 40 mm. The electrodes 14 and 26 are maintained at beam potential, apart from when the electrode 26 is pulsed as described above to suppress heavy ions.

As soon as the first pulse has finished, the emptied acceleration region in the first part 16 starts to be filled by the ion beam again. The delay time until the first electrodes 12 and 14 are pulsed again is determined by the dimensions of the selector, the chosen mass and the beam energy. In the present example, the delay time is 11.7 $\mu$s (rising edge to rising edge).

If the ions in the beam have a broad mass distribution, care has to be taken that no false transmissions take place. In other words, care has to be taken that ions with masses other than the chosen ones are not transmitted. This can happen as ions heavier than the chosen ones may be stopped, not by the deceleration pulse directly following the deceleration pulse, but instead by one of the subsequent deceleration pulses. In the above described embodiment, not only $Ag_1^+$ (mass 108 amu) will be transmitted, but also masses 306 amu, 504 amu, 702 amu and so on. In order to prevent these false transmissions, an additional pulse is applied to one of the side plates 53 adjacent the field-free central region 32 thereby suppressing all heavy ions which are still in the region 32 during the first deceleration phase.

The quadrupole deflector 54 allows the selected beam to be deflected either onto the Faraday cup 55 where the total beam current can be measured or onto the microsphere plate 58 which serves to amplify the beam current for noise reduction. If the measured cluster beam current is satisfactory, the quadrupole deflector 54 is switched off and the cluster beam is focused onto the substrate 70 in the chamber 66 using the einzel lenses 44 and 68. In a typical example, the total ion current extracted is 10 μA, the total cluster current is 1 nA, the typical size selected current on the substrate 70 is 3 pA and the typical deposition time for production of a 0.1% monolayer is 75 seconds.

We claim:

1. A mass selector for separating particles in a particle beam according to mass, said selector including a pair of first electrodes between which is defined an elongate first path for the passage of the particle beam; means for focusing the particle beam so that, in use, a focused particle beam passes along the elongate first path; a pair of second electrodes spaced from the pair of first electrodes in a direction transversely of the direction of extent of the first path, said pair of second electrodes defining therebetween an elongate second path for separated particles, said second path being parallel to said first path; first voltages-applying means for applying a first voltage pulse across said first electrodes so that, in use, the particles in a portion of the beam which is in said elongate first path are accelerated transversely of their direction of movement along said first path towards said second path, second voltage-applying means for applying a second voltage pulse across said second electrodes so that, in use, particles which have been accelerated by said first voltage pulse and which have entered said second path are decelerated transversely of their direction of movement along said second path; and controlling means for controlling the first and second voltage-applying means so that said first voltage pulse accelerates the particles in said portion of the beam with substantially constant momentum acceleration and the second voltage-applying means applies said second voltage pulse with substantially constant momentum deceleration a pre-selected time interval after said first voltage pulse so that particles of the selected mass pass along said second paths in substantially the same mutual dispositions as they travelled along said first path.

2. A mass selector as claimed in claim 1, wherein those of the first and second electrodes which are disposed between the first and second paths are permeable to the particles over the length of the particle beam which is being re-directed, in use, from the first path to the second path.

3. A mass selector as claimed in claim 1, wherein the controlling means is arranged to control the first voltage-applying means so that said first voltage pulse is terminated before the first particle of said particle beam portion has left the first path transversely.

4. A mass selector as claimed in claim 1, wherein the controlling means is arranged to control the second voltage-applying means so that said second voltage pulse is applied when all of the selected particles have entered the second path.

5. A mass selector as claimed in claim 1, wherein the controlling means is arranged to control both of the voltage-applying means so that said voltage pulse and said second voltage pulse are repeated after the emptied acceleration region in the elongate first path has been re-filled by the particle beam.

6. A mass selector as claimed in claim 5, wherein the controlling means is arranged to cause an emptying pulse to be applied at a time such as to empty a space between the first and second path of slower-moving particles.

7. A mass selector as claimed in claim 6, wherein a pair of side plates are disposed on either side of said space, and said emptying pulse is provided by a deceleration pulse applied in use to the second electrode and simultaneously to one of said pair of side plates.

8. A mass selector as claimed in claim 1, wherein means are provided for focusing decelerated selected particles moving along the second path at a location corresponding to the location at which the particles in the first path are focused by the focusing means.

9. A method of separating particles in a particle beam according to mass, said method comprising the steps of causing a focused particle beam to pass along an elongate first path, applying a first voltage pulse across said first path so as to cause particles of the particle beam disposed in said elongate first path to be accelerated transversely with substantially constant momentum acceleration towards an elongate second path which is substantially parallel to said elongate first path, and applying a second voltage pulse across said second path a pre-selected time interval after application of said first voltage pulse across the first path, said second voltage pulse being so as to decelerate the particles which have been accelerated by said first voltage pulse with substantially constant momentum deceleration so as to cause particles of selected mass to pass along said second path in substantially the same mutual dispositions as in the focused particle beam in-the first path.

10. A method as claimed in claim 9, wherein said first voltage pulse is terminated before the first particle of said particle beam portion has left the first path transversely.

11. A method as claimed in claim 9, wherein said second voltage pulse is applied when all of the selected particles have entered the second path.

12. A method as claimed in claim 9, wherein said first voltage pulse and said second voltage pulse are repeated after the emptied acceleration region in the elongate first path has been re-filled by the particle beam.

13. A method as claimed in claim 12, wherein an emptying pulse is applied at a time such as to empty a space between the first and second path of slower-moving particles.

14. A method as claimed in claim 13, wherein the emptying pulse is applied by applying a deceleration pulse to the second electrode and simultaneously to one of a pair of side plates disposed on either side of the space.

15. A method as claimed in claim 9, wherein the decelerated selected particles moving along the second path are focused at a location corresponding to the location at which the particles in the first path are focused by the focusing means.

* * * * *

UNITED STATES PATENT AND TRADEMARK OFFICE

CERTIFICATE OF CORRECTION

PATENT NO. : 6,078,043
DATED : June 20, 2000
INVENTOR(S) : Richard E. Palmer and Bernd Von Issendorff It is certified that error appears in the above-indentified patent and that said Letters Patent is hereby corrected as shown below:

Column 7, claim 1, line 32, delete "voltages-applying" and replace with --voltage-applying--;

line 50, delete "paths" and replace with --path--.

Column 8, claim 9, line 37, delete "in-the" and replace with "in the".

Signed and Sealed this

Tenth Day of April, 2001

Attest:

Nicholas P. Godici

NICHOLAS P. GODICI

*Attesting Officer*

*Acting Director of the United States Patent and Trademark Office*